Jan. 9, 1968     L. V. MALDARELLI     3,362,504

MECHANICAL DAMPER

Filed Sept. 29, 1965

Lawrence V. Maldarelli,
INVENTOR,

BY.

Golove & Kleinberg,
ATTORNEYS.

United States Patent Office 3,362,504
Patented Jan. 9, 1968

3,362,504
MECHANICAL DAMPER
Lawrence Vincent Maldarelli, Duarte, Calif., assignor to Hycon Manufacturing Co., Monrovia, Calif.
Filed Sept. 29, 1965, Ser. No. 491,333
4 Claims. (Cl. 188—1)

The present invention relates in general to damping devices and, in particular, to a mechanical damper.

In the damping of motion, the standard devices used in the prior art have been hydraulic types of dampers in which the viscosity and/or the compressibility of a fluid or gas employed therein is used to damp the motion of a movable plunger. These devices, however, have a marked tendency to leak after a relatively short period of time and are completely useless in situations where the slightest leakage would lead to fluid contamination. In fact, even the possibility of fluid contamination has ruled out the use of such hydraulic dampers in a large number of systems. Gas dampers do not work at all in a vacuum or low ambient atmospheres.

The present invention has succeeded in overcoming the disadvantages of such prior art devices by providing a mechanical type of damper in which a movable damper pad has imparted to it, by external forces, both a parallel and perpendicular motion, relative to a stationary damper plate. The frictional forces present between the pad and the plate result in the damping of such external forces, while the relative values of the parallel and perpendicular motion determine the magnitude of the damping action. In addition, means are provided in the present invention for adjusting the relative values of such parallel and perpendicular motions and, thus, the magnitude of the damping action.

It is the primary object of the present invention, therefore, to provide a damping device.

It is another object of the present invention to provide a damping device of the mechanical variety and which does not use any fluid or gas therein.

It is a further object of the present invention to provide a mechanical damper in which the damping surfaces have imparted relative to one another both parallel and perpendicular motions.

It is still another object of the present invention to provide a mechanical damper in which the magnitude of the damping action can be easily adjusted.

Figure 1:
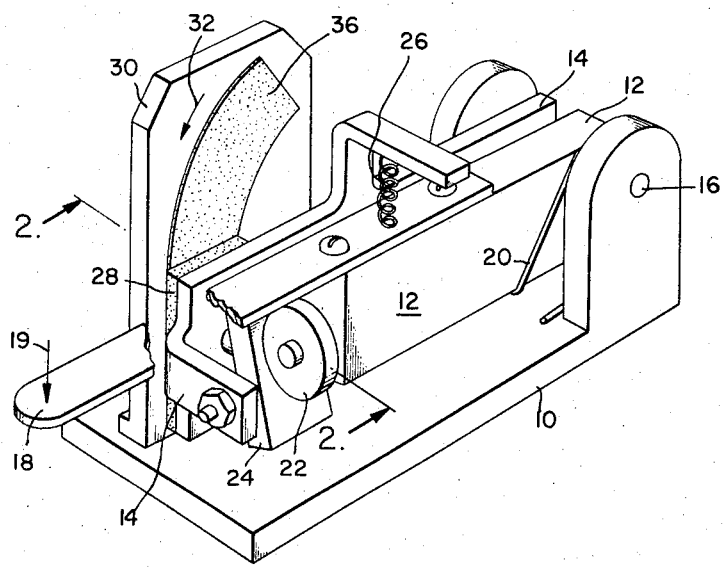
Figure 2:
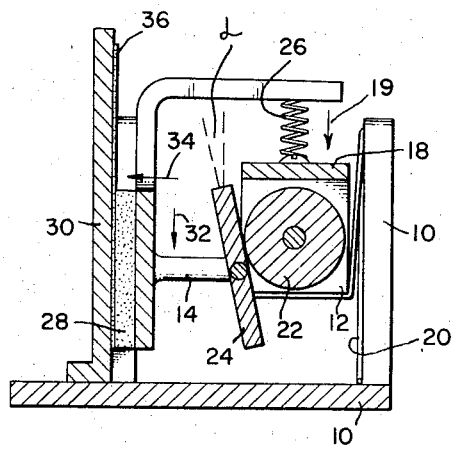

These and other novel features of the invention, together with further objects and advantages thereof, will become apparent from the following detailed specification with reference to the accompanying drawings in which:

FIGURE 1 is a simplified isometric view of a preferred embodiment of the present invention; and FIGURE 2 is a simplified cross-sectional view of the present invention along line 2—2 of FIGURE 1 in the direction of the appended arrows.

Turning now to FIGURES 1 and 2 there is shown a mechanical damper according to the present invention which comprises a base 10 and a lever block 12 and a bracket 14, coupled thereto by pin 16. The lever block 12 has affixed thereto a lever arm 18 by means of which the forces to be damped are applied to the present device.

The lever arm is of a resilient material which may have any desired degree of stiffness. The magnitude of the "stiffness" determines the behavior of the damping device with stiffer materials resulting in devices more nearly resembling hydraulic dampers and more flexible materials resulting in devices more closely resembling pneumatic dampers. The forces acting on the lever arm 18 force it and the lever block 12 towards the base 10 as shown by arrow 19. When the forces are removed, a return spring 20 acts to return the lever arm 18 to its original position. Lever block 12 has a roller bearing 22 coupled thereto which presses against an inclined plane 24 which is affixed to the bracket 14.

The inclined plane 24 and the roller arm 22 are held in contact with one another by a positioning bias spring 26. It should be noted, however, that such a function could also be accomplished by suitable arrangement of the return spring 20. Affixed also to bracket 14 is a damper pad 28, which in conjunction with a damper plate 30 (mounted on base 10) serves to provide the damping action of the present device.

In operation a force applied to the lever arm 18 causes it to travel toward the base 10. Since the roller bearing 22 and the inclined plane 24 are in contact, the vertical force on the lever arm 18 is coupled to the inclined plane 24 and causes it, along with the bracket 14 and the damper pad 28, to travel towards the base 10 as indicated by arrow 32.

The inclined plane 25 is set at an angle with respect to the motion of the lever arm 18, and the lever block 12 and the roller bearing 22, and a portion of the force applied to the lever arm 18 is also transformed into a motion of the inclined plane 24, the bracket 14 and the damper pad 28, that is parallel to the base 10, is indicated by arrow 34. Thus, when a force is applied to the lever arm 18, motions both parallel and perpendicular to the damper plate 30 are imparted to the damper pad 28 which sweeps over an area on damper plate 30 designated generally by reference numeral 36. The frictional force generated by the motion of the damper pad 28, over the surface of the damper plate 30, and the force of the damper pad 28 normal to the damper plate 30, provide the damping action in the present device.

The severity of the damping action is a function both of the magnitude of the velocity imparted to the lever arm 18 and the angle of the inclined plane 24. The motion of the damper pad 28, it is to be noted, is dependent upon the action of the roller bearing 22 on the inclined plane 24.

If a velocity is imparted to the lever arm 18, the roller bearing 22 causes the inclined plane 24 to move and, thus follow the motion of the roller bearing 22. Since, however, the inclined plane is set at an angle to the motion of roller bearing 22, a portion of the force is imparted to the damper pad 28 perpendicular to the damper plate 30 causing the damper pad 28 to bear against the damper plate 30.

A friction force F is thus generated which resists motion parallel to the plane of plate 30 and has a magnitude equal to the force of damper pad 28 against damper plate 30, multiplied by the coefficient of friction of the two surfaces. The friction force produced resists the motion of damper pad 28 and inclined plane 24, and is transmitted through roller bearing 22 and block 12 to lever arm 18. Thus the kinetic energy of whatever is producing force 19 (i.e., the device being damped) is converted to heat (friction between damper pad 28 and plate 30) and its movement is consequently damped.

It is evident that as the velocity imparted to lever arm 18 increases, the frictional force generated between pad 28 and plate 30 also increases, thus increasing the damping action. Thus the damping action is proportional to the velocity of the object or device being damped.

The magnitude of the force required to impart a particular velocity to arm 18 is a function of the angle α of the inclined plane 24. Since the motion of the roller bearing 22 is parallel to the damper plate 30, the smaller the angle α becomes, the less force and motion is applied to the inclined plane 24 parallel to the damper plate 30, and since, the force of the roller bearing 22 is only applied perpendicular to the damper plate 30. As shown above, when the force of the roller bearing 22, and, thus, the damper pad 28, is applied substantially perpendicular to the damper plate 30, the magnitude of the damping action increases. In a like fashion, when the angle α is large, the inclined plane 24 follows the motion of the the roller bearing 22 and the force applied by the roller arm 22 (and the inclined plane 24), perpendicular to the damper plate 30 is small, resulting in a mild damping action. Thus, the magnitude of the damping action in the present device can be easily adjusted by the setting of the angle α of the inclined plane 24, relative to the arc of movement of the roller bearing 22 and the lever arm 18.

Having thus described the invention, it is apparent that numerous modifications and departures may now be made by those skilled in the art, all of which fall within the scope contemplated by the invention. Consequently, the invention herein disclosed is to be construed as limited only by the spirit and scope of the appended claims.

What is claimed as new is:
1. A mechanical damper comprising:
 (A) a stationary damper plate;
 (B) a movable damper pad positioned adjacent said damper plate and capable of motions substantially parallel and substantially perpendicular to said damper plate; and
 (C) converting means receptive to motions to be damped for converting said motions into said parallel and perpendicular motion of said damper pad including:
  (1) a resilient lever arm;
  (2) an adjustable inclined plane coupled to one of said damper pad and lever arm and selectably set at an angle with respect to said damper pad; and
  (3) a roller member coupled to the other of said damper pad and said lever arm, for transmitting therebetween only those forces that are normal to said inclined plane.
2. A mechanical damper comprising:
 (A) a movable resilient lever arm for receiving motions to be damped;
 (B) a stationary damper plate;
 (C) a movable damper pad;
 (D) first means for supporting said damper pad and for coupling the motion of said movable lever arm thereto; and
 (E) second means connected to said lever arm for applying a portion of the force of said lever arm to said damper pad in a direction substantially perpendicular to said damper plate, one of said first and second means having a curved surface and the other of said first and second means having a substantially planar surface.
3. The mechanical damper of claim 2 above wherein said planar surface of said other of said first and second means is adjustable for varying the force transmitted to said damper pad normal to said damper plate.
4. A mechanical damper comprising:
 (A) a lever arm for receiving motions to be damped;
 (B) a shaft coupled to said lever arm;
 (C) a roller bearing mounted on said shaft;
 (D) an angularly adjustable inclined plane positioned to receive the motion of said roller bearing for converting said motion into motions for said inclined plane, both substantially parallel and substantially perpendicular to said motion;
 (E) a damper pad;
 (F) means for supporting said damper pad and said inclined plane and for coupling the motion of said inclined plane to said damper pad; and
 (G) a stationary damper plate positioned to receive the motion of said damper pad.

References Cited

UNITED STATES PATENTS

| | | | |
|---|---|---|---|
| 2,703,156 | 3/1955 | Depallens | 188—129 |
| 2,752,149 | 6/1956 | Forcellini | 188—129 X |
| 3,145,012 | 8/1964 | Kfoury | 188—1 X |

DUANE A. REGER, *Primary Examiner.*